United States Patent [19]

Bottasso et al.

[11] 4,054,475
[45] Oct. 18, 1977

[54] METHOD FOR PRODUCING A CONTINUOUS BAND OF RUBBERIZED FABRIC HAVING TRANSVERSAL REINFORCING METAL ELEMENTS

[75] Inventors: Franco Bottasso; Antonio Pacciarini, both of Milan, Italy

[73] Assignee: Industrie Pirelli S.p.A., Milan, Italy

[21] Appl. No.: 647,157

[22] Filed: Jan. 7, 1976

Related U.S. Application Data

[62] Division of Ser. No. 485,007, July 1, 1974, Pat. No. 3,962,022.

[30] Foreign Application Priority Data

July 3, 1973 Italy .................................. 26121/73

[51] Int. Cl.$^2$ ........................................... B65H 19/00
[52] U.S. Cl. ................................ 156/157; 156/304; 156/507
[58] Field of Search ............... 156/157, 159, 304, 502, 156/507, 538, 556, 558

[56] References Cited

U.S. PATENT DOCUMENTS

| | | | |
|---|---|---|---|
| 2,956,615 | 10/1960 | Hasselquist | 156/502 |
| 3,100,731 | 8/1963 | Brat | 156/364 |
| 3,130,100 | 4/1964 | Hasselquist | 156/507 |
| 3,141,805 | 7/1964 | Gough et al. | 156/353 |
| 3,325,328 | 6/1967 | Henley | 156/157 |
| 3,433,690 | 3/1969 | Barns | 156/157 |
| 3,589,959 | 6/1971 | Sander et al. | 156/157 |
| 3,802,982 | 4/1974 | Alderfer | 156/148 |
| 3,962,022 | 6/1976 | Bottasso et al. | 156/559 |

FOREIGN PATENT DOCUMENTS 1,487,807  6/1966  France

Primary Examiner—David A. Simmons
Attorney, Agent, or Firm—Stevens, Davis, Miller & Mosher

[57] ABSTRACT

A method is disclosed for accurately and readily forming a continuous band of rubberized fabric having transversal reinforcing metal elements by butt-splicing wherein a first and second piece of rubberized fabric having transversal reinforcing metal elements are positioned such that the initial end of the second piece is a predetermined distance from the terminal end of the first piece on a common plane with the reinforcing metal cords running parallel to the ends of the pieces, butt-splicing the pieces, without overlapping, by mutually approaching the pieces, obtaining a uniform accumulation of the rubber of the rubberized fabric about the reinforcing cords as well as a local thickening of the latter at a zone symmetrically situated with respect to the contact surface of the ends and whose width is proportional to the pre-established distance wherein the pieces are bound by the operating parts of the splicing apparatus, releasing the pieces from the operating parts of the splicing apparatus and winding up the continuous band on a collecting drum. An apparatus for producing the continuous band is also disclosed where the operating parts have a base element and a movable ledger capable of locking the pieces of rubberized fabric on a common plane by a series of fingers.

5 Claims, 8 Drawing Figures

METHOD FOR PRODUCING A CONTINUOUS BAND OF RUBBERIZED FABRIC HAVING TRANSVERSAL REINFORCING METAL ELEMENTS

This is a division of application Ser. No. 485,007, filed July 1, 1974, now U.S. Pat. No. 3,962,022.

The present invention concerns a method and an apparatus for producing a continuous band of rubberized fabric provided with transversal reinforcing metal cords, namely cords arranged in a direction perpendicular to the winding direction of the band.

It is known that bands of this kind are obtained by starting from a sheet of rubberized fabric provided with longitudinal cords, which sheet is cut into pieces of rectangular shape. These pieces are then spliced together, the one after the other, at their ends parallel to the direction of the reinforcing elements.

These bands of rubberized fabric provided with transversal reinforcing elements are used, in pieces of convenient length, to build up the carcass of "radial" tires, in which the carcass-reinforcing cords are arranged along planes passing through the tire's axis of rotation.

In the manufacture of a band of rubberized fabric provided with transversal reinforcing cords, the two most important steps are the mutual alignment of the various pieces during their transfer from the cutter to the splicing apparatus, and the splicing in a direction parallel to that of the reinforcing cords. In particular, the latter can be carried out by overlapping the adjacent ends of the pieces or by an end-to-end splice, namely without any superimposition of said ends and only by virtue of the tackiness of the uncured rubber.

Obviously, this second splicing method is preferred since it ensures a better continuity and uniformity of the rubberized fabric obtained and since it does not waste material.

However, its practical realization is particularly complicated.

The first of said phases is in fact often effected prevailingly with manual means, so that the desired accuracy is not always achieved.

The second of said steps is of difficult realization, particularly as a consequence of the possible irregular conditions of the ends of the pieces being spliced.

The present invention aims to provide a method and an apparatus by means of which a continuous band of rubberized fabric having transversal reinforcing metal cords is obtained, which is devoid of discontinuities or disuniformities of any kind, wherein the alignment and the butt-splicing of the various pieces can be carried out with relatively simple means and great accuracy and without any manual action.

Accordingly, a first object of the invention is a method for producing a continuous band of rubberized fabric having transversal reinforcing metal cords, which comprises the following steps:

arranging the terminal end of a first rectangular piece of rubberized fabric at a first operating part of the splicing apparatus, said terminal end being parallel to the direction of the metal cords of the piece;

picking up a second piece of rubberized fabric by means of a translating element;

advancing the second piece, by means of the translating element, in a direction perpendicular to that of its reinforcing metal cords, at the end of said advancement the two pieces being situated on a single plane and the second piece moreover having its initial end at a second operating part of the splicing apparatus and positioned at a pre-established distance from the terminal end of the first piece;

blocking the two pieces by means of the operating parts of the splicing apparatus;

butt-splicing said terminal end, without overlapping, to said initial end in order to form the continuous band of rubberized fabric;

releasing the two pieces from said operating parts of the splicing apparatus; and winding up the continuous band on a collecting drum;

wherein the blocking of the two pieces is carried out by clamping each of them at a pre-established distance from its own end which is to be spliced to the other;

the splicing between said pieces is carried out by the mutual approach of said ends on the plane common to the two pieces, which are bound by said operating parts of the splicing apparatus, so as to further obtain a uniform accumulation of the rubber of the rubberized fabric about the reinforcing cords as well as a local thickening of the latter at a zone situated symmetrically with respect to the contact surface of said ends and having a width proportional to said pre-established distance.

A further object of the present invention is an apparatus capable of carrying out the alignment and the butt-splicing of the various pieces of rubberized cords, so as to obtain a continuous band having transversal reinforcing metal cords.

The present invention will be better understood and appreciated from the following description, made by way of nonlimiting example and referring to a particularly advantageous embodiment. To this end, reference is also made to the attached figures, in which.

Figure 1:
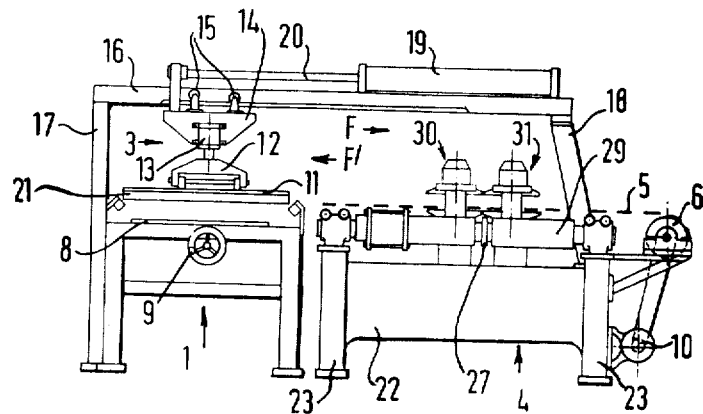
FIG. 1 is a side view of an apparatus in accordance with the present invention.

It must be taken into account that, for the sake of convenience and simplicity of language, in the present description reference is made to a first and to a second piece, even if actually the so-called first piece is already generally constituted by a continuous band of rubberized fabric, formed by an indefinite number of previously butt-spliced pieces.

The second piece is indicated in the present description with the reference numeral 2, although it takes three successive different positions on the apparatus during the working phase wherein it lies on the feeding roller plane, under the translating element and on the splicing apparatus.

Figure 2:
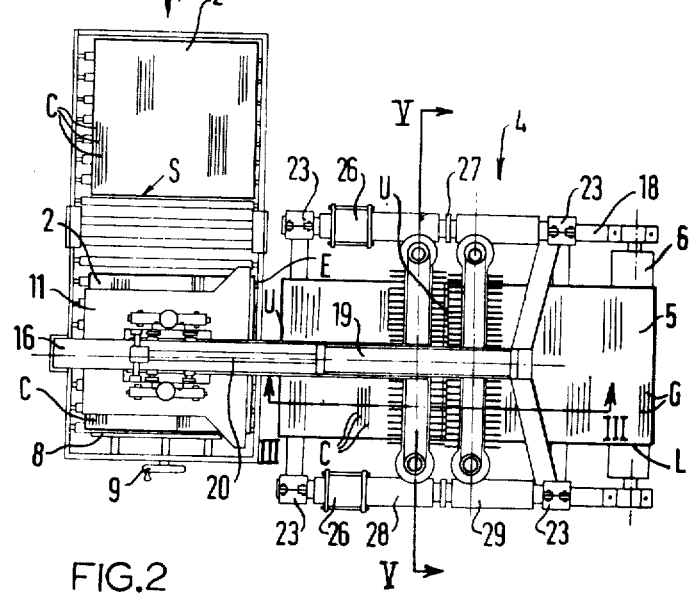
FIG. 2 is a plan view of same.

From FIGS. 1 and 2 it can be seen that the apparatus substantially comprises: a roller plane 1 for supplying the so-called piece 2 of rubberized fabric; a translating element 3 which picks up the piece 2 and locates it as explained herebelow; a splicing device 4 to butt-splice the initial end E of the so-called second piece 2 with the terminal end U of the so-called first piece 5; and a drum 6 for collecting the continuous band of rubberized fabric formed after the splicing of said pieces.

The apparatus comprises moreover: a vertical plate 8 whose portion can be adjusted by means of a handwheel 9 in order that its surface directed towards the roller plane 1 and parallel to the lateral edges L of the first piece 5 be strictly aligned with one of them; and a motor 10 for winding up the band on the collecting drum 6.

As shown in FIG. 2, the roller plane 1 is situated perpendicularly to the direction of motion of the translating element 3 (which moves in the directions of arrows F and F') (FIG. 1) and to the axis of the splicing device 4; this means that the roller plane is parallel to the direction of the reinforcing metal cords C of pieces 2 and 5, which are arranged "transversally", namely perpendicularly to the winding direction of the band of rubberized fabric on the collecting drum 6.

Figure 6:
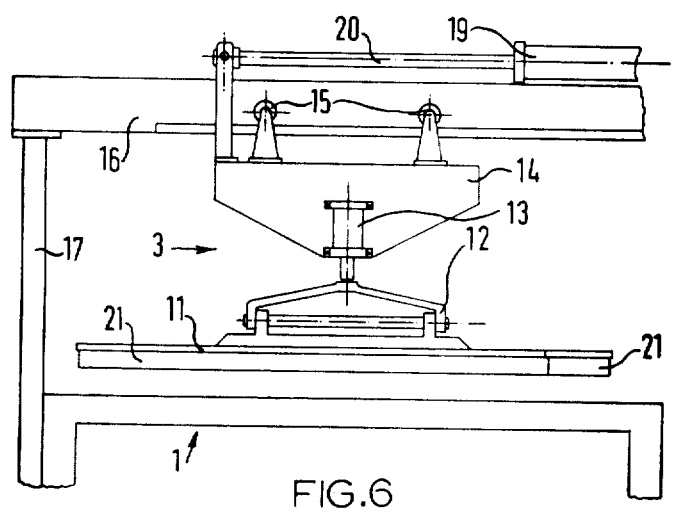
FIG. 6 is an enlarged side view of the translating element.

The translating element 3 (FIGS. 1, 2, 6) comprises a metal plate 11 which is suspended, by means of a support 12 and of a hydraulic piston 13 having a vertical axis, to a vertical carriage 14 provided with wheels 15 which can slide on the wings of a beam 16 in the form of overturned T; the later is fixed to the roller plane 1 by means of a vertical stanchion 17 and to the splicing device 4 by means of a frame 18.

The beam 16 carries, rigidly fixed to it, the body of a double-acting cylinder 19 whose stem 20 is instead fast with the carriage 14; therefore, permitting introduction of compressed fluid in the cylinder 19, in the two possible ways; it is possible to obtain the already mentioned senses of motion of the translating element 3, indicated by arrows F and F'.

The plate 11 of the translating element 3 is provided with a series of electromagnets 21 which serve to keep the piece 2 hooked during its positioning on the splicing device.

To this purpose, the plate 11 can moreover be raised and lowered by means of the vertical piston 13.

The other highly relevant part of the present apparatus is constituted by the splicing device 4, illustrated particularly in FIGS. 2, 3, 4 and 5.

Splicing device 4 comprises a rectangular support 22 provided at its corners with four vertical columns 23; said columns are connected together two by two, in a direction parallel to the direction of movement of the translating element 3, by means of two shafts 24, parallel to each other, on which are keyed two pistons 25 of as many double-acting cylinders 26.

The central part of each shaft 24 is threaded and onto it is screwed a ring nut 27 for adjusting the stroke of the corresponding cylinder 26.

Figure 4:
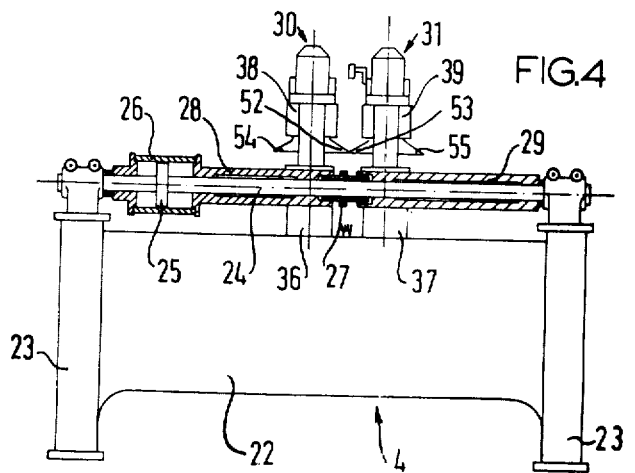
FIG. 4 is a section of the splicing apparatus taken along line IV—IV of FIG. 2.

As can be seen in FIG. 4, the body of each cylinder 26 is fast with a first hollow shaft 28 arranged with a certain diametrical clearance on the corresponding shaft 24 and, more exactly on the part of the latter which is here conventionally defined as "upstream" the ring nut 27.

Around the part of each shaft 24 which is here conventionally defined as "downstream" the ring nut 27 is keyed a second hollow shaft 29, equal to the first hollow shaft 28 but made integral with the shaft 24. By adjusting the fluid under pressure in the two possible ways inside the double-acting cylinders 26, it is then possible to obtain horizontal movements of the hollow shaft 28 with respect to the hollow shaft 29, which remains stationary.

Each pair of hollow shafts 28 and 29, respectively, is connected with one of the operating parts of the splicing device, respectively 30, 31, said parts being symmetrical to each other with respect to the vertical plane defined by the ring nut 27.

Figure 3:
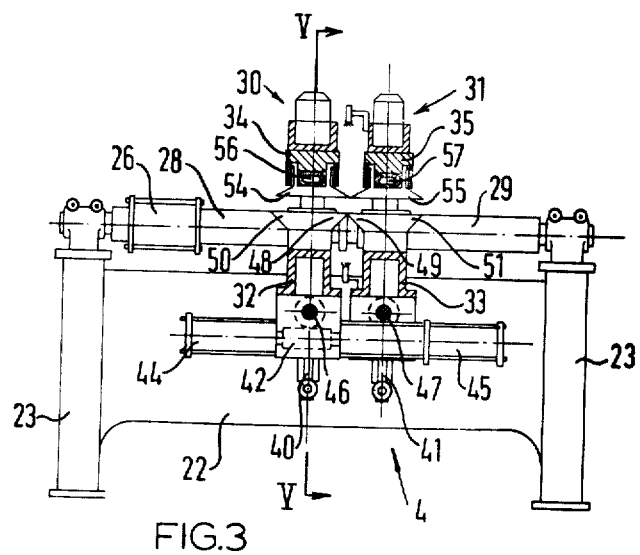
FIG. 3 is a section of the splicing apparatus taken along line III—III of FIG. 2.

Each of said operating parts 30 and 31 comprises a base element 32 and 33 and a movable upper ledger 34 and 35 (FIG. 3). Each of the base elements 32 and 33 is fast, respectively, with the hollow shafts 28 and 29 (FIG. 5) by a pair of vertical hollow shafts 36 and 37; therefore the base elements 32 and 33 are stationary in the vertical sense. On its turn, each of the movable ledgers 34 and 35 is joined to a pair of vertical shafts 38 and 39, mounted with a certain diametrical clearance in the vertical hollow shafts 36 and 37.

The vertical shafts 38 and 39 can slide vertically inside the hollow shafts 36 and 37; in fact they are inferiorly fast to the big ends of the connecting rods, 40 and 41 respectively; the small ends of the connecting rods are actuated by knurled stems 42, 43 of the double-acting cylinders 44 and 45, which the interposition of a gear 46 and 47.

Figure 5:
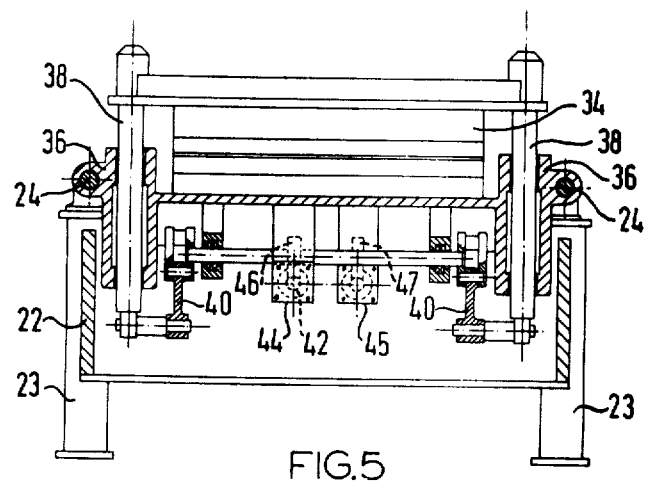
FIG. 5 is a section of the splicing apparatus taken along line V—V of FIG. 2 and also shown in FIG. 3.

Consequently, the admission of the fluid under pressure inside cylinder 44 and 45 in either of the two possible ways determines the displacement of said knurled stems and therefore the lifting and lowering of the movable upper ledgers 34 and 35 (see FIG. 5).

The base elements 32 and 33 comprise a first series of coplanar fingers 48 and 49, intercalated with one another, which are situated at the ends to be spliced of pieces 2 and 5, and a second series of fingers 50 and 51, coplanar and integral with those of the first series, and lying at the side opposite to them with respect to the vertical plane passing through the axes of shafts 38 and 39 (see FIGS. 2 and 3). On their turn, the movable ledgers 34 and 35 comprise a first and second series of coplanar fingers, respectively 52 and 53, 54 and 55. The fingers belonging to the movable ledgers are superimposed to the fingers belonging to the base elements. As opposed to the fingers forming part of the base elements, the fingers forming part of the movable ledgers are not directly integral with the latter, but are fast to it through special inflatable chambers, 56 and 57 respectively, enclosed respectively in the ledgers 34 and 35.

By inflating said chambers 56 and 57, the fingers 52 and 53 are further lowered with respect to the respective movable ledgers after which the latter will have reached their low position, determined by cylinders 44 and 45.

Figure 7:
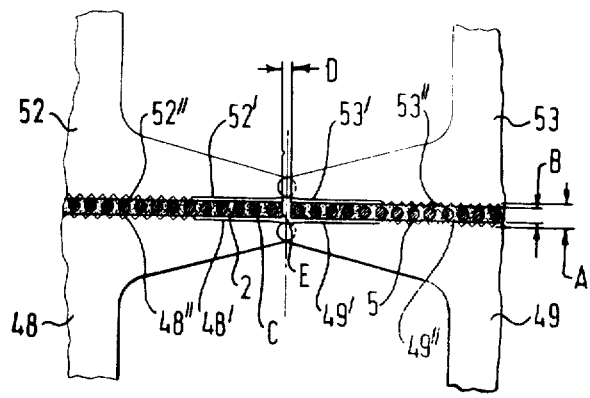
FIGS. 7 and 8 represent—along line III—III of FIG. 2—the most characteristic details, appropriately enlarged, of the splicing apparatus during two different moments of the splicing phase.

The main features of the splicing device resides in the fact that the fingers 48, 49, 52, 53 have a "composite" surface (FIG. 7), in the sense that they present a first smooth surface, 48', 49', 52' and 53' respectively, in correspondence of two bands situated symmetrically at the two sides of the ends to be spliced of pieces 2 and 5, and a knurled part 48", 49", 52" and 53", respectively.

The distance, measured vertically, between the fingers belonging to each operating part is so chosen that it is always greater at the smooth surface of the fingers than at their knurled surface. This circumstance is noticeable in any moment of the operation of the present apparatus; therefore, when the splicing of the ends 2 and 5 is carried out in the way which will now be further illustrated, the distance between the fingers of each of the symmetrical operating parts 30 and 31 has a value A, at the smooth surfaces, which is greater than value B at the knurled surfaces (see FIGS. 7 and 8).

Practically, the distance B is so pre-established that the pieces 2 and 5 are blocked between the knurled surfaces 48" and 52", 49" and 53", while the distance A is such as to leave a vertical clearance between the surfaces of the pieces 2 and 5 and the smooth surfaces 48', and 52', 49' and 53' of the fingers.

At last, it is to be noted that the fingers belonging to each of the symmetrical operating parts 30 and 31 engage with one another, when the movable ledgers, after having been lowered, are mutually approached during the splicing of the pieces 2 and 5; this means that there is always a certain interference between said fingers, on the planes containing them, namely that they are mutually intercalated.

Coming now to the operation of the present apparatus, it begins when the so-called first rectangular piece of rubberized fabric 5 is situated with its terminal end U at the operating part 31, downstream the splicing device 4. More exactly, the terminal end U is situated in the position shown in FIG. 7, exception made for the circumstance that the movable ledgers 34 and 35 of the splicing device are lifted with respect to their respective base elements 32 and 33. Meanwhile, the so-called second piece 2 (which has been previously cut to the desired size by means of two cuts perpendicular to the direction of its reinforcing metal cords with a cutter, not illustrated), travels on the roller plane 1 in the sense indicated by the arrow F* (FIG. 2).

This movement of the second piece 2 terminates when its fore end S touches the vertical plate 8.

As the position of the latter has been previously adjusted by means of the handwheel 9, so that its surface directed towards the side plane 1 is perfectly aligned with the lateral edges L of the first piece 5, the second piece is automatically oriented in such a way that its cords C are exactly parallel to the cords C of the first piece 5.

In this position (FIG. 2) the second piece 2 is picked up by the translating element 3. More precisely, the plate 11 of the later is brought into contact with the upper surface of the piece 2, which remains adherent thereto by virtue of the current circulated in the electromagnets 21.

Immediately after said picking up, the piston 13 lifts the plate 11 with the piece 2, while the double-acting cylinder 19 is so actuated that its stem causes the advancement of the carriage 14, and therefore of the piece 2, in the sense indicated by the arrow F. Said advancement, which is therefore effected in a direction perpendicular to that of the cords C, terminates when the initial end E of the piece 2 corresponds to the operating part 30 upstream the splicing device 4.

In this position, the piece 2 is laid on the plane identified by the rows of fingers 48, 49, 50 and 51 of the base elements 32 and 33 of the splicing device, which plane is preferably not coplanar with the roller plane from which the second piece has been taken up, and is situated nearly at the same level as the plane along which the second piece moves during its positioning stroke. The minimum necessary hollow space only is provided between the two surfaces to avoid rubbing of the piece on said plane during said stroke.

The positioning of the piece 2 is obtained by simply disconnecting the power supply to the electromagnets 21 of the translating element 3, and said positioning is such that the initial and E of said piece is at a pre-established distance (indicated by D in FIG. 7) from the terminal end U of the first piece 5.

In said position, the pieces 2 and 5 are perfectly aligned and coplanar.

At this moment, while the translating element 3 moves away in the direction of the arrow F', the two pieces are blocked by lowering the movable ledgers 34 and 35 and by inflating the chambers 56 and 57, which bring the knurled surfaces of the fingers into engagement with the surfaces of the two pieces.

Also during this blocking, the ends E and U remain coplanar to each other and to the respective pieces 2 and 5.

At this moment, the butt-splicing of the pieces is carried out without overlapping. It comprises a first step in which the fluid under pressure is sent to the double-acting cylinders 26 in such a way that their bodies move in the direction of the arrow F, together with the hollow shaft 28 and to the operating part 30 of the splicing device, while part 31, fast with the hollow shaft 29 and therefore to the shaft 24, remains stationary.

Figure 8:
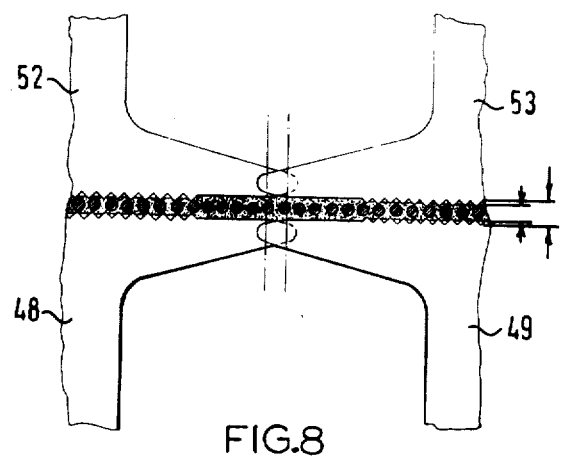

The stroke effected by the hollow shaft 28 is stopped, in the pre-established longitudinal position, by the ring nut 27 and is such that, at the end of this first step, the condition is that illustrated in FIG. 8. As it can be seen, by virtue of the approaching of piece 2 to piece 5, a uniform action of accumulation of the rubber of the rubberized fabric takes place at a band situated symmetrical astride the surface of mutual contact of the ends E and U. The width of said band is substantially defined by the mutual position of the knurled surfaces of the fingers at the end of said approach and therefore said width is proportional to the distance of ends E and U from said knurled surfaces.

The accumulation of the rubber takes place because the recesses of height A, which exist initially around the surfaces of the fingers, are filled by the rubber of the rubberized fabric, since the pieces cannot move on the plane containing them, because they are blocked by the knurled surfaces of the fingers themselves.

Simultaneously with said accumulation, in the first phase a local thickening of the cords C of the pieces takes place at said band.

This first phase is followed by another phase, typical of the present invention, like the first, which provides the detachment of the operating part 30 upstream the splicing line from the downstream part 31, in the direction of the arrow F', so that the above-described operations are repeated in an opposite sense.

As the rubber of the rubberized fabric is in a plastic condition, it returns to the condition it had before splicing at said smooth surfaces of the fingers; the same takes place in respect of the thickness of the reinforcing metal cords. Of course, the butt-splicing of pieces 2 and 5 at their respective initial end E and terminal end U remains unaffected.

Then the chambers 56 and 57 are deflated and the movable ledgers 34 and 35 are lifted in order to allow the continuous winding up of the continuous band of rubberized fabric provided with transversal reinforcing metal cords, on the collecting drum 6, in the length necessary to have the terminal end U of the so-called piece 2 positioned in the same position which the terminal end U of piece 5 had at the beginning of the cycle.

The advantages afforded by the here described method and apparatus are evident. First of all, there is a perfect alignment of the pieces to be spliced together. Said alignment is ensured by the vertical plate 8 and by the translating element 3, provided with magnets 21, for picking up and positioning the so-called second piece with respect to the so-called first piece.

Secondly, the splicing is carried out in a simple and reliable manner and in such a way that, at its end, the surface of the so-obtained continuous band of rubberized fabric is appreciably uniform for its whole length, even on the above described band situated astride the true splicing surface. Therefore the maximum circumferential uniformity of the tire carcasses which are built up by using the so formed band of rubberized fabric is ensured.

At last, it is to be pointed out that the herein described method and apparatus, in particular the splicing device, do not give the same very good results if they are used for splicing two pieces of cord fabric reinforced with non-metallic cords. In fact, the latter have a transversal rigidity which is much lower than that of the metal, preferably steel cords, so that the positioning of the piece is difficult and inaccurate, and the splice, in consequence of both causes, is irregular and not uniform.

Conveniently, the present apparatus can be provided with lamps for radiation heating the initial end of the so-called second piece up to the softening temperature (about 60° C) of the rubber of its rubberized fabric, before being picked up by the translating element. In this way the butt-splicing of the two pieces is further facilitated.

Although the present invention has been here described according to a particular advantageous embodiment, it is to be understood that the scope of protection of said invention includes also all the modifications accessible to the technicians of this field derivable from the above indicated inventive concept.

What is claimed is:

1. In a method for manufacturing a continuous band of rubberized fabric provided with transversal reinforcing metal cords, by butt-splicing, without overlapping, two identical quadrangular pieces of said rubberized fabric along their facing splicing edges, parallel to said metal cords, said edges being respectively defined as "terminal end" and "initial end", the "terminal end" being the edge of the continuous band already built up, and the "initial end" being the edge of the piece to be spliced to said band, said method comprising the steps of:

arranging the terminal end of said continuous band between two corresponding parts of a first operating portion of a splicing apparatus, advancing the piece to be spliced towards said band so that at the end of said advancement said piece is coplanar with said band, arranged between two corresponding parts of a second operating portion of said splicing apparatus with its initial end facing the terminal end of said band, blocking said band and said piece, by pressing them between said two parts respectively, of said first operating portion and said second operating portion of the splicing apparatus, mutually approaching said ends for a first determined distance, in order to obtain the butt-splicing of said band with said piece, releasing said band and said piece from the two parts of said respective first operating portion and said second operating portion of the splicing apparatus, and winding up the continuous band so built up, onto a collecting drum, the improvement comprising the steps of applying said blocking pressure on the area of said band and said piece beginning from a pre-established distance from each of said respective terminal and initial ends, so that both said band and said strip of fabric are free from said blocking pressure along said pre-established distance and along the ends to be spliced, and causing, by said mutual approaching of said ends, an increase of the density of the reinforcing cords in the zone astride the contact surface of said ends whose width depends on said pre-established distance and said first determined distance, and an accumulation of the rubber about the cords in said zone, causing the thickness of the fabric to be raised in this zone.

2. The method of claim 1, comprising the further step of mutually sending away, for a second determined distance, said band from said piece, just joined together, by a mutual removal of said portions of the splicing apparatus maintaining meanwhile said blocking pressure, whereby the thickness of the fabric and the density of the cords, in said zone, are substantially brought back to their initial value, before the splicing, while maintaining however, said band butt-spliced with said piece.

3. The method of claim 1 wherein the rubber of the rubberized fabric is heated at its initial end, intended to undergo said accumulation in a phase prior to splicing.

4. The method of claim 3 wherein heating is effected by radiation to bring the rubber to a temperature near its softening temperature facilitating the successive butt-splicing.

5. The method of claim 1 wherein the ends to be spliced are mutually approached by maintaining the continuous band stationary and by moving the piece to be spliced, both previously blocked by means of the corresponding operating parts of the splicing device, on a plane common to both of them.

* * * * *